J. C. KITTON.
REFRIGERATING APPARATUS.
APPLICATION FILED JULY 24, 1912.
1,069,790.
Patented Aug. 12, 1913.
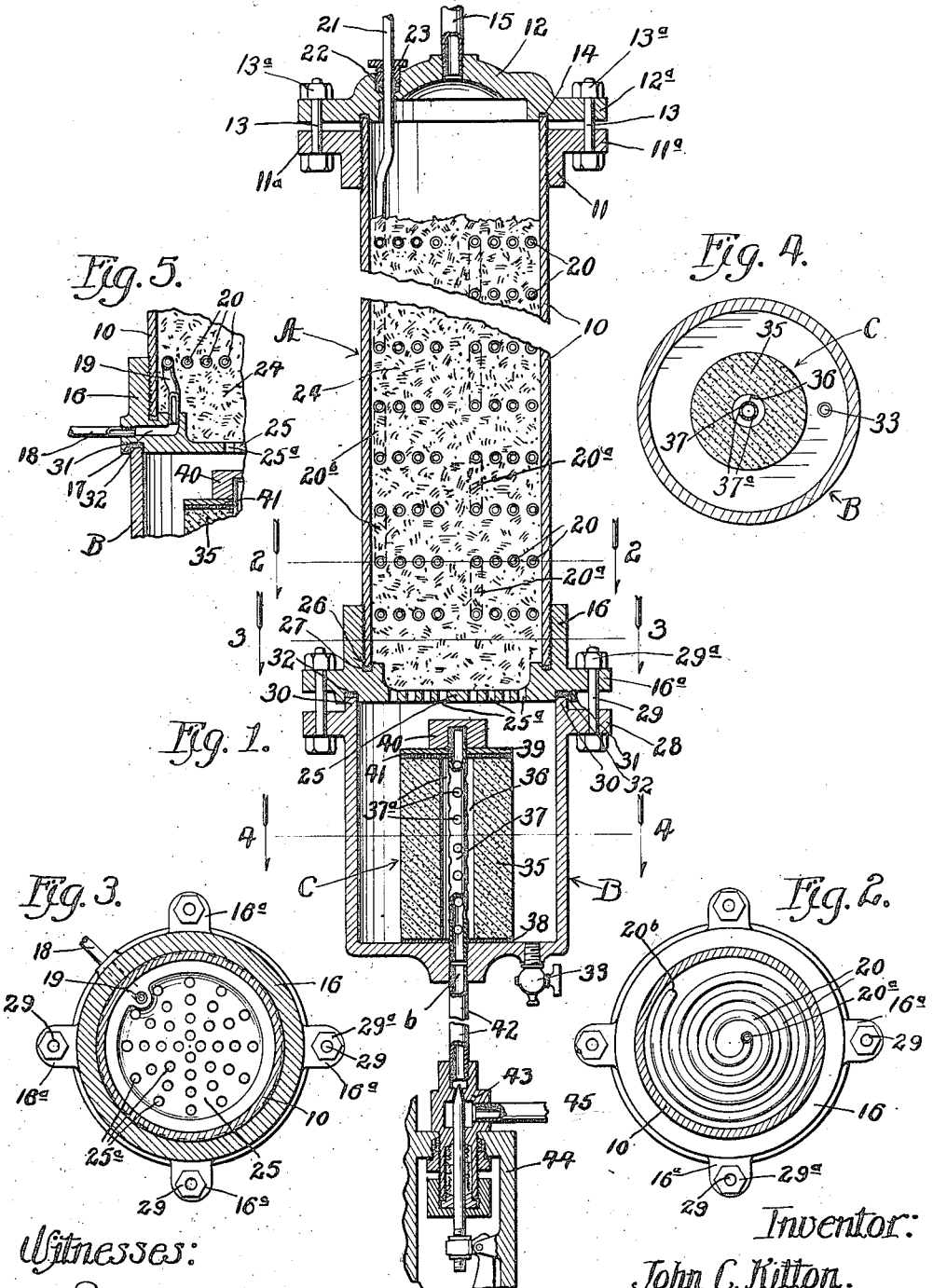
Witnesses:
P. F. Poole
Chas. A. Poole
Inventor:
John C. Kitton.
by Poole & Cromer
Attys.

UNITED STATES PATENT OFFICE.

JOHN C. KITTON, OF CHICAGO, ILLINOIS.

REFRIGERATING APPARATUS.

1,069,790. Specification of Letters Patent. Patented Aug. 12, 1913.

Application filed July 24, 1912. Serial No. 711,219.

*To all whom it may concern:*

Be it known that I, JOHN C. KITTON, a citizen of the United States, and a resident of Chicago, in the county of Cook and State of Illinois, have invented certain new and useful Improvements in Refrigerating Apparatus; and I do hereby declare that the following is a full, clear, and exact description thereof, reference being had to the accompanying drawings, and to the letters of reference marked thereon, which form a part of this specification.

This invention relates to improvements in condensing apparatus for refrigerating systems and more particularly to that class of such apparatus applicable for use in refrigerating systems in which ammonia gas is employed as the refrigerant.

The condenser in a refrigerating system is designed to receive the ammonia gas from the compressor of such system under a high pressure and at a high temperature. In passing through the condenser the hot gas is subjected to the cooling effect of a continuous flow of water which removes a portion of the sensible heat of the gas, sufficient to condense the gas, or in other words, to transform the compressed ammonia gas from a gaseous to a liquid state. From the condenser the liquefied ammonia gas is discharged into a receiver from which it passes through an automatically controlled pressure regulating valve into the absorption or refrigerating coils.

One object of this invention is to provide an improved construction in a condenser, by which a device of this kind is given greater efficiency in proportion to its size and cost.

Another object of the invention is to provide for the filtration of the liquid ammonia, before it is allowed to pass to the absorber or refrigerating coils, in order to remove any particles of solid matter that may be contained in the liquid, and which if allowed to remain in the liquid, would tend to interfere with the proper operation of the regulating valve.

Still another object of the invention is to provide a construction in which is combined a condensing chamber, a receiver, and a filter, in a single compact unit, whereby is obtained a device which occupies a minimum amount of space, and may be produced at a low cost of manufacture.

The invention consists in the matters hereinafter described and more particularly pointed out in the appended claims.

In the drawings—Figure 1 is a longitudinal, cross-sectional view taken through the central axis of my improved condenser, and showing the filter and the automatically controlled valve through which the liquefied gas is discharged into the absorber; Fig. 2 is a cross-sectional view taken on line 2—2 of Fig. 1; Fig. 3 is a cross-sectional view taken on line 3—3 of Fig. 1, with the crushed quartz omitted; Fig. 4 is a cross-sectional view taken on line 4—4 of Fig. 1; Fig. 5 is a detail cross-section showing the inlet to the cooling water coils at the lower part of the condensing chamber.

Referring to the drawings, the condensing apparatus comprises three elements, namely, a condensing chamber A, a receiver B, and a filter C. The condensing chamber is provided with means adapted to condense the ammonia gas, the receiver serves to contain the condensed fluid delivered from the condenser, and the filter acts to remove solid particles from the condensed or liquefied ammonia gas before it reaches the regulating valve in passing from the receiver. The condensing chamber A is cylindric in form, and the body of the same consists of a metal shell or casing 10. Having screw-threaded engagement with the upper extremity of said casing 10 is a collar 11, so placed that the margin of said casing 10 projects slightly above the upper face of the said collar 11. Said collar is provided with a plurality of lugs 11ª. A removable cap 12, provided with a plurality of lugs 12ª, is adapted to cover the top of the casing and to be held thereon by a plurality of bolts 13 passing through the lugs 11ª of the collar 11 and the similarly arranged lugs 12ª of the cap 12, and nuts 13ª applied to said bolts 13 and bearing upon the cap 12. Said cap 12 is provided upon its lower surface with an annular groove adapted to register with and to receive the upper margin of the casing 10. A gasket 14 of lead or other suitable material is placed within the groove, to prevent leakage of the gas. A small distance separates the adjacent faces of the collar 11 and the cap 12, to permit a tightening of the joint between the casing 10 and the cap 12. A pipe 15, having screw-threaded engagement with the cap 12 at its central portion, forms the means of transmitting the ammonia gas from the compressor to the interior of the condensing chamber A.

At the lower end of the casing is an intermediate partition member or separator cap 16 constituting a lower head for the condensing chamber and also a partition separating the condensing chamber A from the receiver B. Said partition is shown as having screw-threaded connection with the lower end of the casing. Further details regarding said partition member will be elsewhere stated. Extending horizontally through the lateral wall of said separator cap 16 (Fig. 5) is an inlet passage 17 which connects a water supply pipe 18 with a pipe 19 within the condensing chamber. Said pipe 19 constitutes the lower extremity of a water circulating system, which comprises a plurality of spiral coils 20, arranged at equal distances apart throughout substantially the entire length of the interior of the casing 10. The spiral coils are joined one to another to form a single circuit for cooling water, which enters the lower spiral coil and, passing upward through the succeeding coils, is discharged at the top of the condenser. The said spiral coils are preferably joined in the following manner: The coils constituting each pair of coils are connected at the inner ends of the spirals by inclined pipes 20$^a$ and the outer end of each of the spirals constituting a pair is joined to the spiral immediately above or below it by a vertical pipe 20$^b$. Therefore, referring to Figs. 1 and 5, the water enters the outer coil of the lower spiral, and flows spirally inward to the center of the same, flows upward through the pipe 20$^a$ to the spiral coil above it, through that coil spirally outward and then upward through the pipe 20$^b$ to the outer coil of the succeeding coil and inward again, and so on until it reaches the outer coil of the upper spiral where the pipe is bent upward and its extremity 21 passes through the cap 12 adjacent to the wall of the casing. To prevent leakage of the gas at the point where the pipe 21 passes through the cap 12, a packing 22 and gland 23 are employed. Between and surrounding the spiral coils is a mass or filling 24 of crushed quartz or other suitable granular material, occupying the interior of the casing with the exception of a small space at the top thereof. This filling of crushed quartz is composed of pieces or particles of such size or the filling is of such density, that the gas will pass through the same in a downward direction, and at the same time be retarded in its flow and diffused throughout all parts of the mass. As a result of such retardation and of the diffusion of the gas in or through the interstices of the mass, the gas will pass slowly over or in contact with the cooling pipes and will come into contact with the cooling pipes in a minutely subdivided form, with the result of greatly facilitating the transfer of heat therefrom and of effecting a more rapid absorption of heat from the gas, than would be the case if the gas surrounded the pipes in an undivided state.

Referring again to the partition member 16, the same has a central portion 25 adapted to act as a retainer to support the mineral contents of the condensing chamber. Said central portion 25 is foraminous, or provided with a plurality of uniformly arranged holes 25$^a$ of a size to retain the pulverized material, but to allow the liquefied ammonia gas to pass from the condensing chamber to the receiver.

In the upper surface of the partition member, exterior to the perforated central part 25 thereof is an annular groove 26, adapted to contain a gasket 27 of lead or like material and to receive the lower margin of the casing 10. The partition member is further provided with outwardly extending lugs 16$^a$.

Immediately below the partition member 16 is the receiver B adapted to contain the liquid flowing from the condenser and which has the form of a cylindric vessel provided with an integral bottom wall, open at its top and provided at its upper margin with a plurality of lugs 28, adapted to register with the similar lugs 16$^a$ of the partition member 16. Bolts 29 passing through said lugs 28 and 16$^a$ and nuts 29$^a$ on said bolts hold the receiver rigidly to the condenser chamber. The said receiver B is provided with an upwardly projecting annular flange 30, adapted to enter an annular groove 31, formed in the partition member and containing a gasket 32 of lead or like material, to insure a non-leakable joint. A purge valve 33 is provided in the bottom of the receiver to allow impurities or sediment to be discharged therefrom, and for the purpose of cleaning the device. The said receiver B contains a filter C. Said filter comprises a cylinder 35 of porous stone or like material, which is supported in a vertical position upon the central portion of the floor of said receiver, and provided with a centrally located, longitudinal aperture 36. A pipe 37 having screw-threaded engagement with the central discharge opening of the receiver, extends upwardly through said aperture 36 and a short distance above the cylinder. Interposed between said cylinder 35 and the floor of the receiver is a rubber gasket 38. Said cylinder 35 is maintained in position by means of a washer 39 and a nut 40; the latter having screw-threaded engagement with the upper extremity of the pipe 37. A rubber gasket 41 is interposed between said washer 39 and the top of the cylinder 35. The purpose of said gaskets 38 and 41 is to prevent the liquid from entering the pipe 37 in any way but through the walls of the porous cylinder. Holes 37ª are provided in the sides of the pipe 37, adapted to permit the passage of the liquid ammonia gas into the said pipe 37, and from the filter. Said pipe 37 communicates with another pipe 42, which leads to a controlling valve 43, which forms a part of an automatically operated regulating device 44 employed for controlling the supply of the liquefied ammonia, through the pipe 45, into the refrigerating coils (not shown) of the refrigerating apparatus. Said valve 43, and the associated parts of the regulating device, as illustrated, correspond with the construction set forth in an application for Letters Patent, Serial Number 711,220, filed simultaneously herewith.

The device as above described, operates as follows: The compressed ammonia gas at a high temperature enters the condensing chamber at its top through the pipe 15, and passes downwardly through the condensing chamber. At the same time a current of water is passing through the coils 20, entering at the base of the condensing chamber, and discharging at the top through the pipe 21; the directions of flow of the fluids thus being opposed to each other. When the current of hot gas passes into and through the mass of crushed quartz, the same is broken up or diffused, whereby the gas is brought into contact with the pipes in a subdivided form. Said contact of the gas with the pipes of a lower temperature results in the absorption of heat from the gas by the cooling water, in a degree required to condense or liquefy the gas. As the gas is liquefied, it trickles through the crushed quartz to the bottom of the condenser, where it flows through the holes 25ª in the partition member 16, into the receiver B. The liquid being under high pressure, is then forced through the filter C and thence into the pipe 37, where it is fed into the absorption coils through the controlling valve 43.

The advantages gained by the construction of the heat absorbing means of the condenser hereinbefore described may be understood from the following: The form of condenser heretofore more commonly employed consists of duplex coiled pipes, one pipe being within the other and the gas passing through the inner pipe while the water passes through the space between the pipes. Such a condenser requires a great length in the pipes or coils, in order to secure the required cooling effect. By the use of the novel construction described, embracing a chamber, coils therein and a filling of granular material, the gas is brought into contact with the coils in a manner to insure a rapid cooling thereof, both by being retarded and diffused, by the action of the granular material, in its flow or movement through the condensing chamber. As hereinbefore stated, the gas entering the condenser chamber is retarded in its flow by the granular material, so that it will be retained in contact with the cooling pipes a sufficient length of time for the proper transmission of its heat to the cooling medium, and such gas will also be diffused and subdivided, with the result that it will part with its heat more rapidly than when flowing through a pipe surrounded by the cooling medium, or when the gas passes in an undivided state, through a space containing cooling coils. This improved cooling effect results not only from retardation and diffusion of the gas but also from the fact that heat is transmitted more readily through a mass of granular material than through a body of gas, so that the granular material itself aids in the transmission of heat from the gas to the surface of the cooling pipe. Furthermore, a smaller amount of cooling water is required in my improved device and consequently a larger amount of heat is absorbed per unit volume of water. The cooling device described, moreover, is not only cheap and simple in construction but occupies very much less space than in the case of double pipe or like old forms of condensers.

An important advantage is gained by the employment of a filter interposed between the condenser and controlling valve, for the reason that such valves are designed for very minute regulation and are liable to be clogged or rendered inoperative by the entrance of very small particles of solid matter between the valve closure and its seat. The filter thus arranged retains any such solid particles, and this insures the continuous and uninterrupted operation of said controlling valve.

The apparatus illustrated, wherein the condenser, receiver and filter are united in a single structure, has important advantages by reason of the decrease in cost of construction and small space occupied by the parts when thus made.

A device embodying the features of my invention is applicable to uses other than in refrigerating systems. Moreover, the features of construction embodying the invention may be variously modified without departure from the spirit of the invention and I do not, therefore, wish to be limited to the particular details shown in the accompanying drawings, except so far as the same may be pointed out in the appended claims constituting parts of my invention. Furthermore, a device embodying the features hereinbefore described, to wit; a chamber, a pipe within said chamber and a mass of granular material surrounding said pipe, is equally well adapted to be used in all cases where it is desired to transmit heat from one fluid to another irrespective of the nature of the fluids. As for instance in applying these several features to refrigerating apparatus the same may be used as a means for condensing, for refrigerating, or for evaporating.

I claim as my invention:

1. In a condensing device, the combination of a condensing chamber adapted to receive a fluid in its gaseous state, means within said condensing chamber adapted to contain a heat-absorbing medium, and means within said condensing chamber adapted to retard the flow of gas through the same.

2. In a condensing device, the combination of a condensing chamber adapted to receive a fluid in its gaseous state, means contained within said chamber adapted to contain a heat-absorbing medium, and means within the chamber adapted to diffuse throughout the interior of the chamber the gas supplied to the same.

3. A condensing device, comprising an inclosure adapted to receive a fluid in its gaseous state, a coiled pipe occupying the space within said chamber and adapted to contain a heat-absorbing medium, and means within the chamber and surrounding said pipe, adapted to retard the flow and diffuse throughout the chamber the gas delivered to the same.

4. A condensing device comprising an inclosure or chamber, a pipe within said chamber adapted to contain a heat-absorbing medium, and a mass of granular material contained in said chamber and surrounding the said pipe.

5. In a condensing apparatus, the combination of an inclosure or chamber, a coil of pipe occupying the interior of said chamber, and a filling of granular material contained within said chamber and surrounding the said coil of pipe.

6. In a condensing device, the combination of a chamber, a coil of pipe within said chamber, a receptacle attached to the bottom of said chamber, an apertured partition separating said receptacle from said chamber, and a mass of granular material contained in said receptacle and surrounding the circulating coils therein.

7. In a condensing device, the combination of a chamber, a receptacle attached to the bottom of said chamber, an apertured partition between the top of said receptacle and the bottom of the chamber, a coil of pipe within said chamber, a filling of granular material contained within said chamber and surrounding the coil of pipe, and a regulating valve connected with the bottom of said receptacle for controlling the discharge of fluid therefrom.

8. In a condensing device, the combination of a condensing chamber adapted to contain a medium, means within said chamber for cooling a gas introduced into said chamber, a mass of granular material contained in said chamber and surrounding said cooling means, a receptacle located below the said chamber and adapted to receive by gravity the condensed liquid therefrom, and a regulating valve located below the said receptacle and adapted to receive by gravity the liquid from said receptacle.

9. In a condensing device, the combination of a vertically elongated condensing chamber, a circulating pipe for a cooling medium, contained within said chamber and consisting of a plurality of connected spiral coils arranged parallel with each other and occupying substantially the full length of said chamber, and a filling of granular material surrounding said coils of pipe and substantially filling said chamber.

10. In a condensing device, the combination of a vertically elongated condensing chamber, a circulating pipe for a cooling medium, contained within said chamber and consisting of a plurality of connected coils arranged parallel with each other and occupying substantially the full height of said chamber, a filling of granular material surrounding said coils of pipe and substantially filling said chamber, a receptacle attached to the bottom of said chamber, and an apertured partition, separating said receptacle from said chamber, and adapted to retain the granular material within the chamber and permit the flow of liquefied gas into said receptacle.

11. In a refrigerating apparatus, the combination of a condensing chamber containing a heat-absorbing means, and a mass of granular material, a regulating valve controlling the discharge of liquid from the condensing chamber, and a filter interposed between said condensing chamber and said valve.

12. In a refrigerating apparatus, the combination of a condensing chamber containing a heat-absorbing means, and a mass of granular material, a receiver for the condensed fluid provided with a discharge passage, a regulating valve in said passage for controlling the discharge of fluid from the receiver, and a mass of filtering material interposed between the liquid containing space of said receiver and the said discharge passage.

13. The combination of a condensing chamber, means within said chamber adapted to contain a heat-absorbing means, a receptacle connected with the bottom of said chamber, adapted to receive the condensed fluid, a regulating valve for controlling the discharge of liquid from said receptacle, and a filter contained within said receptacle.

14. In a condensing device, the combination of a condensing chamber adapted to receive a fluid in its gaseous state, means contained within said condensing chamber adapted to contain a heat-absorbing medium, means within said condensing chamber adapted to retard the flow of gas through the same, a receptacle adapted to receive the fluid from the condensing chamber, and a filter contained within said receptacle and adapted to filter the fluid in its discharge from said receptacle.

15. In a condensing device, the combination of a condensing chamber adapted to receive a fluid in its gaseous state, means contained within said condensing chamber adapted to contain a heat-absorbing medium, means within said condensing chamber adapted to retard the flow of gas through the same, a receptacle adapted to receive the fluid from the condensing chamber, a regulating valve for controlling the discharge of liquid from said receptacle, and a filter contained within said receptacle and adapted to filter the liquefied fluid in its passage from said receptacle to the said valve.

16. In a condensing device, the combination of a condensing chamber, circulating coils within said chamber, a receptacle attached to the bottom of said chamber, an apertured partition separating said receptacle from said chamber, a mass of granular material contained in said receptacle and surrounding the circulating coils therein, and a filter contained within said receptacle and adapted to filter the fluid in its discharge from said receptacle.

17. In a condensing device, the combination of a condensing chamber, circulating coils within said chamber, a receptacle attached to the bottom of said chamber, an apertured partition separating said receptacle from said chamber, a mass of granular material contained in said receptacle surrounding the circulating coils therein, a regulating valve adapted to control the discharge of liquid from the said receptacle, and a filter contained within said receptacle and adapted to filter the liquefied fluid in its discharge from said receptacle to said valve.

18. In a condensing device, the combination of a condensing chamber, a receptacle attached to the bottom of said condensing chamber, an apertured partition between the top of said receptacle and the bottom of the condensing chamber, a coil of pipe within said chamber, a mass of granular material contained within said chamber and surrounding the coil of pipe, a regulating valve connected with the bottom of said receptacle for controlling the discharge of fluid therefrom, and a filter contained within said receptacle adapted to filter the liquid in the discharge of same from said receptacle to said valve.

19. In a condensing device, the combination of a condensing chamber, means within said chamber adapted to contain a heat-absorbing medium, a receptacle located below the said chamber, provided in its bottom with a discharge opening, a regulating valve located below the said receptacle and adapted to receive the liquid from said discharge opening, and a filter contained within said receptacle and consisting of a tubular mass of porous material, the central opening of which is in communication with the discharge opening in the bottom of said receptacle.

20. In a condensing apparatus, the combination of a condensing chamber, means within said chamber adapted to contain a heat-absorbing medium, a receptacle adapted to receive the condensed fluid from said chamber, and provided with a discharge opening in its bottom, a hollow filtering cylinder of porous material, an upright discharge pipe secured in said opening and provided with a plurality of apertures, a washer surrounding the upper end of said pipe and bearing against the top of said filtering cylinder, a nut engaging the upper end of said pipe and bearing against said washer; said nut being adapted to close the upper end of said pipe, and gaskets interposed between the washer and the filtering cylinder and between said cylinder and the bottom wall of the receptacle.

21. Means for transmitting heat from one fluid to another comprising an inclosure or chamber, a pipe within said chamber adapted to contain one of said fluids, and a mass of granular material contained in said chamber and surrounding the said pipe.

In testimony, that I claim the foregoing as my invention I affix my signature in the presence of two witnesses, this 19th day of July, A. D. 1912.

JOHN C. KITTON.

Witnesses:
 CHARLES H. POOLE,
 EUGENE C. WAUN.